UNITED STATES PATENT OFFICE.

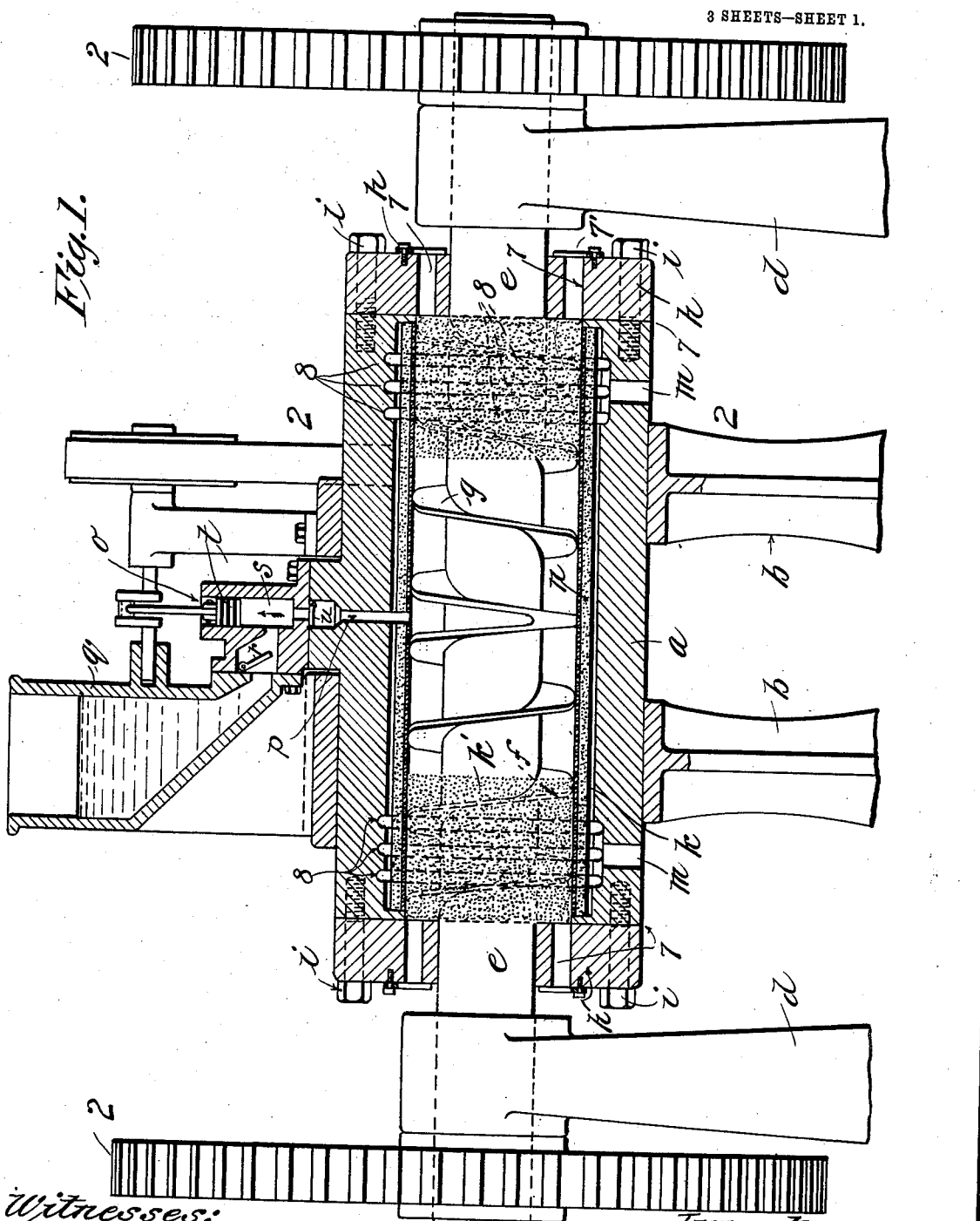

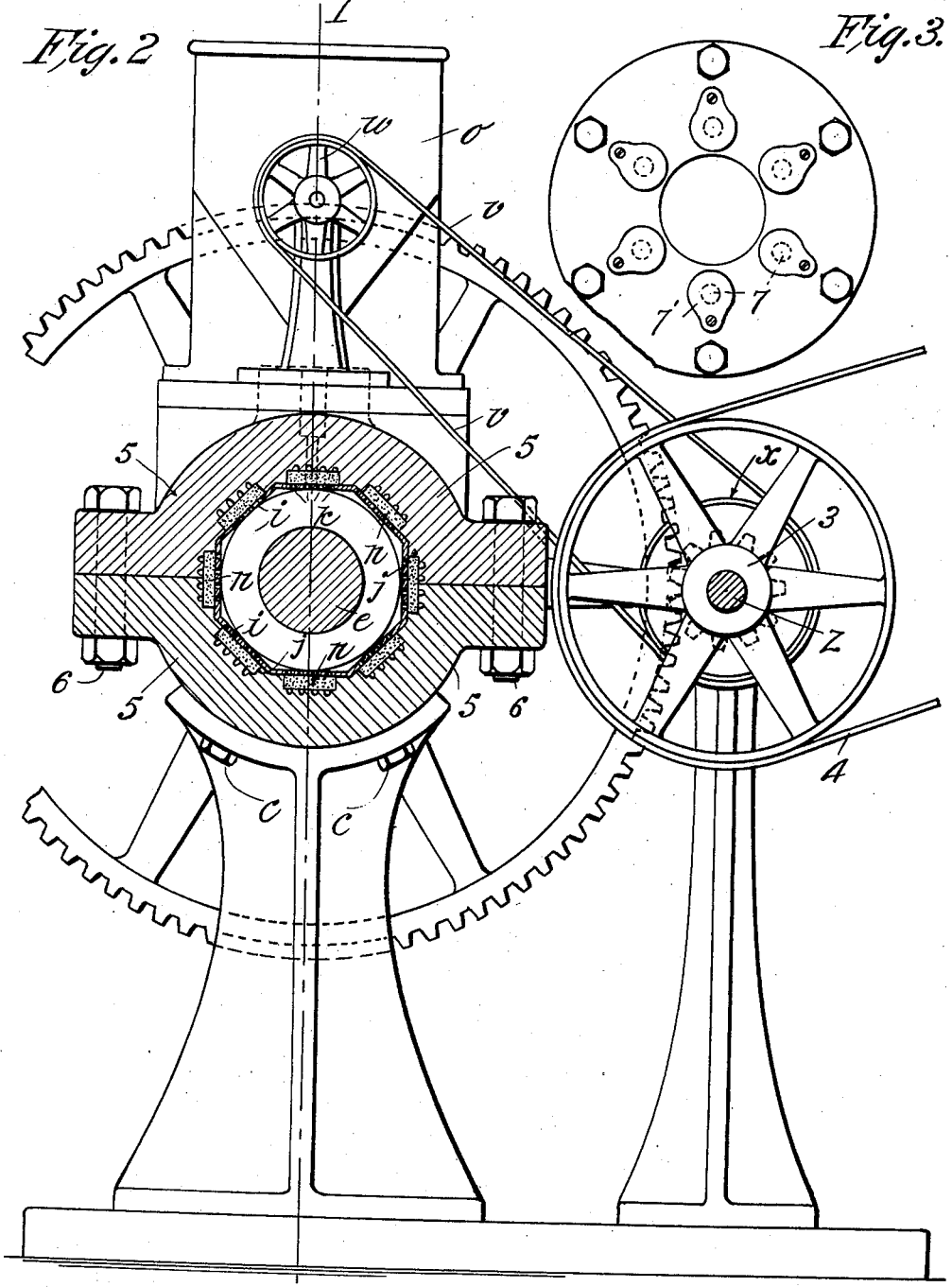

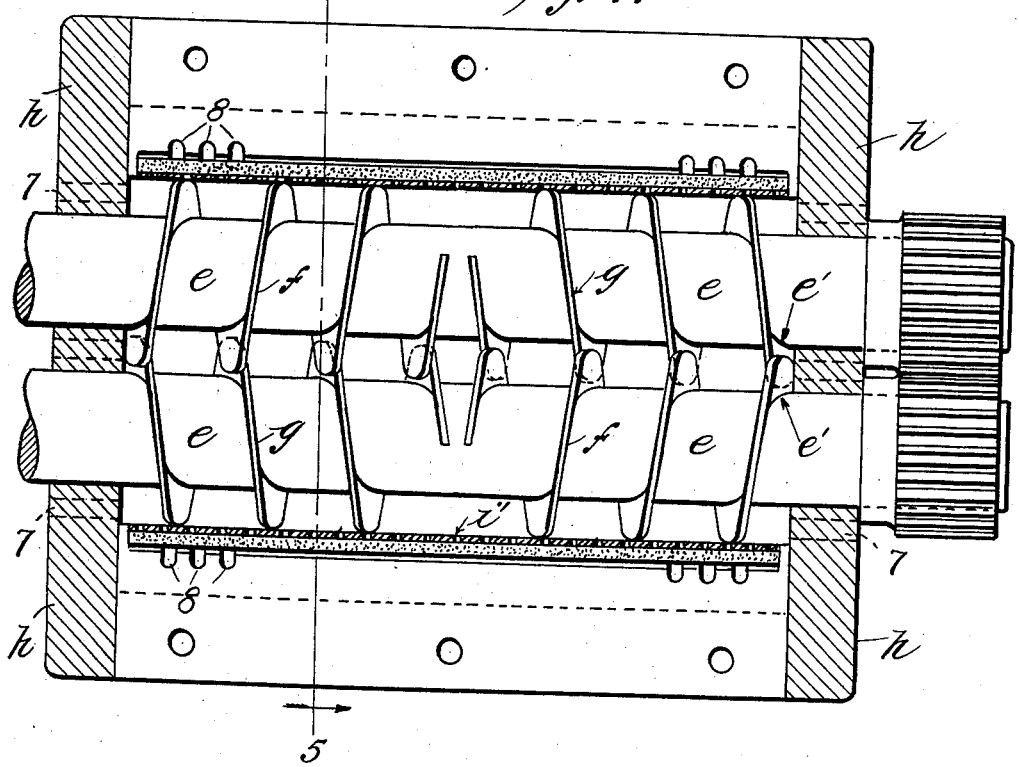
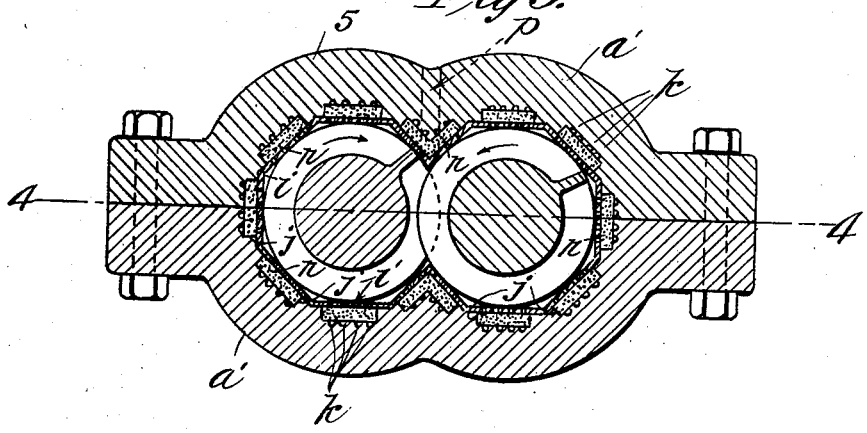

GABRIEL CARLSON, OF SPRINGFIELD, MASSACHUSETTS.

CONTINUOUS-SCREW CHOCOLATE-PRESS.

No. 840,298.

Specification of Letters Patent.

Patented Jan. 1, 1907.

Application filed December 26, 1905. Serial No. 293,317.

*To all whom it may concern:*

Be it known that I, GABRIEL CARLSON, a citizen of the United States of America, residing at Springfield, in the county of Hampden and State of Massachusetts, have invented new and useful Improvements in Continuous-Screw Chocolate-Presses, of which the following is a specification.

This invention relates to the class of presses and, broadly, to that class known as "chocolate-presses;" and it has for its object to produce a machine that is continuous and automatic in its operation.

Broadly, the invention consists in forcing, by means of a pump or other suitable means, the semiliquid or viscous chocolate or paste into a cylinder in which is located a continuously-rotated screw and which acts as a slowly-moving partition or wall to retard the movement of the pasty mass toward the end of the cylinder, and during this slow movement of the screw the moisture or water is gradually forced or expressed from the pasty material through the perforated sheet-lining and a series of longitudinal strips of felt beneath the perforated lining in the interior of the cylinder, while the dry material is forced out at the end of the cylinder through an opening therein, and, further, the invention consists, broadly, in forming a cake of dry material at an end of the cylinder, which acts as an abutment or wall against which the semiliquid or pasty mass is forced by the feeding-in pump, said dry cake and pasty mass being very slowly moved by the screw to gradually expel the dry material at the ends of the cylinder.

This invention distinctly differs from the presses now in use, which have a screw extending toward a restricted opening in the end of the cylinder, through which the dry material can escape. It employs a screw having a very slow movement, the interior of the cylinder having a felt lining, whereby a cake of dry material is formed at an end of the cylinder, and between the dry cake the pasty material is forced into the cylinder under great pressure, embodying, in effect, the principle of the hydraulic press.

By the continuous operation of the feeding-in pump the mass of pasty material is put under great pressure in the cylinder between the slow-moving cake and the feeding-in pump, whereby the moisture or water is thoroughly extracted by the felt lining within the cylinder. The pasty material is put under great lateral pressure against the interior wall of the perforated lining of sheet-steel, as well as against the cake of dry material at the opposite end of the cylinder.

Referring to the drawings forming part of this application, Figure 1 is a vertical longitudinal section on the line 1 1, Fig. 2. Fig. 2 is a vertical transverse section on the line 2 2 of Fig. 1. Fig. 3 is a detail end view of the discharge end of the cylinder. Fig. 4 is a horizontal sectional view on line 4 4 of Fig. 5, showing the use of two right and left hand threaded screws. Fig. 5 is a vertical sectional view on line 5 5 of Fig. 4.

In the drawings, $a$ designates the cylinder, of cast-iron or other suitable material, which is rigidly secured to the two posts $b$ by means of the machine-bolts $c$. (Shown in Fig. 2.)

$d$ designates the pedestals at the opposite end of the press, which are for the purpose of supporting the shaft of the longitudinal screw $e$, carrying the right and left handed screw-blades $f$ and $g$.

Bolted to the opposite ends of the cylinder $a$ are the cylinder-heads $h$ and adjustably secured by the bolts $i$. The interior of the cylinder has a lining of perforated sheet-steel $i'$ and a series of longitudinal grooves $j$, eight of which are shown in Fig. 2. In the bottom of these grooves $j$ are placed or milled a series of parallel longitudinal grooves or channels $k$, four of which are shown in Fig. 2. These series of grooves or channels $j$ are in communication at the end of the cylinder with the outlets $m$ for carrying away the moisture or water which has been extracted from the semiliquid chocolate, the moisture having been forced through the layer or layers of felt $n$, which are placed in the grooves $j$, as shown, and immediately over the channels or smaller grooves $k$. The strips of felt, which extend nearly the entire length of the interior of the cylinder or cylinders, as shown in the drawings, are in contact with the lining of sheet-steel, while the threads of the screw $e$, as clearly shown, are in close engagement with the perforated lining of sheet-steel.

The letter $o$ designates as a whole a pump of any suitable construction which is used to force the semiliquid chocolate through the opening $p$ into the interior of the cylinder. As shown, the pump consists of a receptacle or hopper $q$, into which the liquid or viscous chocolate is placed. At the lower end of this receptacle is a valve $r$, which controls the passage-way to the pump-cylinder s, in which reciprocates the piston t of the pump. A valve u controls the passage-way leading from the cylinder s to the opening p through the cylinder a. The pump is driven by means of a belt v, which connects the two pulleys w and x, the pulley w being mounted on the pump-shaft, while the pulley x is mounted on the driving-shaft z.

Secured to the opposite ends of the screw e are two large spur-gears 2, which are placed outside of the pedestals d, as shown in Fig. 1.

The shaft z extends longitudinally of the machine and carries pinions 3, which drive the large spur-gears 2, the belt 4 being connected to any suitable motive power.

It will be noticed that the cylinder composing the press proper is made in two pieces 5, which are secured together by means of the bolts 6. The object of constructing the cylinder in two pieces facilitates the planing or cutting of the longitudinal grooves or channels in the interior of the same.

It will be noticed that Fig. 1 shows the cylinder-heads h perforated at 7, having closing devices 7', (see Fig. 3,) the purpose of which is to allow the dry chocolate to continuously escape from the press when the screw is revolved during the operation.

At the opposite ends of the cylinders on the interior thereof a series of grooves or channels 8 are turned, and they are in communication with the outlets m.

In operation the liquid chocolate is placed in a receptacle q and forced or fed down through the opening p into the cylinder a, (or cylinders a' when two are used,) entering the same at the middle point thereof between the right and left hand threads or blades f and g of the screw, where it is fed in opposite directions toward the end of the cylinder. As the liquid chocolate is forced into the cylinder in opposite directions by the pump, it is subjected to great pressure by reason of the fact that the pump operates faster than the screw, embodying, in effect, the principle of the hydraulic press. The openings 7 at the ends of the cylinders being very small perfectly dry chocolate is formed as cakes at the ends of the cylinder on account of the slow rotation of the screw and the comparatively rapid operation of the pump. The moisture or water is therefore forced through the perforated steel lining and the felt n into the channels k, where it follows the grooves or channels k to the outlets m. (See Fig. 1.)

The dry chocolate accumulates in the end of the cylinder, forming a dry cake, as indicated by the reference-letter k' the pasty material being placed under pressure by reason of the fact that it is confined between the dry cake k' at opposite ends of the cylinder and the outlet p from the pump o. The slow rotation of the screw or screws acts to prevent the pump from forcing the semiliquid material through the machine too fast and around the cylindrical screw-shaft e and through the openings 7.

I have found that in the operation of this machine the pressure on the chocolate paste is caused entirely by the pump o. The precise point in the cylinder a or a' at which the pasty mass forms a perfectly dry cake from the pasty material is an arbitrary one; but it is found to be substantially at the point indicated in the drawings by the cake k'. The formation of a dry cake of chocolate at opposite ends of the cylinder, and thereby exerting lateral pressure on the side walls of the cylinder, is a most important feature of my invention, and upon this principle my invention is broadly based and herein claimed. The turned grooves 8 at opposite ends of the cylinders being in communication with all of the longitudinal grooves, the channels j and k serve to carry the water that has been forced from the chocolate through the various strips of felt down to the outlets m.

By means of this machine all of the moisture can be extracted from the chocolate, and the same escapes as a dry or pulverized powder through the openings 7 at opposite ends of the cylinders, a most important feature being that the press can be regulated so as to extract more or less of the moisture. This is accomplished by adjusting the pieces 7' at the ends of the cylinders and in varying the speed of rotation of the screw.

The interior of the cylinder, as shown in cross-section is octagonal, although it may be circular. The interior shape, however, forms no part of my invention, the only point being that the interior of the same is substantially filled by the revolving screw.

In the modified arrangement shown in Figs. 4 and 5 I employ two screws in the same horizontal line, the screws each having a right and left hand thread and the threads of the two screws overlapping each other, as shown, the purpose of this overlapping arrangement being to automatically scrape or clean the blades of the screws during the operation of the press in order to prevent the chocolate or pasty material adhering thereto and moving as a solid mass with the screw within the body of the cylinder, as might be the case when only one screw is used. It is to be understood that this modified arrangement employs the perforated lining of sheet-steel or other material and a backing of felt for extracting the moisture and the grooves below the layers of felt for carrying away the moisture to outside of the cylinder and operative means for simultaneously driving the pump and screws, as in Fig. 1. The two screws are rotated by gearing, as shown, at the opposite ends of the screw-shafts and in opposite directions, as shown by the arrows e'.

I have not deemed it necessary to show the driving means connecting the two screws and the pump in either Figs. 4 or 5, as such means forms no part of my invention and is identical with that shown in Figs. 1 and 2.

Having thus described my invention, what I claim, and desire to secure by Letters Patent of the United States, is—

1. In a device of the class described, the combination with a cylinder, longitudinal grooves in the interior thereof and communicating with openings adjacent the ends of the cylinder, absorbent material in the longitudinal grooves, adjustable cylinder-heads, a screw adjacent said absorbent material, and means for forcing the material into the cylinder, and operating means for said screw and said forcing means.

2. In a continuous chocolate-press, a cylinder, longitudinal grooves extending nearly the entire length of the interior of the cylinder, transverse grooves in communication with the longitudinal grooves, absorbent material located in said longitudinal grooves, cylinder-heads rigidly secured to the ends of the cylinder and having openings therethrough, a right and left hand threaded screw located in said cylinder, and means for forcing the material from which moisture is to be extracted into the cylinder, and operating means for the cylinder and the feeding means.

3. In a chocolate-press, the combination of a cylinder, a screw therein, a series of grooves located in the interior of the cylinder, said grooves having a series of grooves in the bottom of the same, absorbent material located in the first series of grooves and over the second series of grooves, outlets in the opposite ends of the cylinder communicating with said series of grooves, cylinder-heads secured to the opposite ends of the cylinder, a pump for forcing the chocolate into the cylinder and located midway of the cylinder, and means for simultaneously operating the pump and the screw located in the cylinder.

4. In a device of the class described, the combination with a cylinder, a series of longitudinal grooves extending nearly the entire length of the interior of the cylinder, a series of transverse grooves or channels communicating with the longitudinal grooves, absorbent material in the longitudinal grooves, cylinder-heads secured to the opposite ends of the cylinders and having openings therethrough, a right and left hand threaded screw located in the said cylinder, a receptacle for holding the material from which the moisture is to be extracted, outlets communicating with the bottom of the receptacle and the interior of the cylinder, and connected operating mechanism for simultaneously forcing the material into the cylinder thereof, and forcing it therefrom.

5. In a machine of the class described, a cylinder having closed ends provided with a restricted opening in one of said ends, means to introduce pasty material into the cylinder under pressure, a device to retard the movement of said material toward the opening in the end of said cylinder to create lateral pressure against the wall of the cylinder, and a porous lining for the cylinder.

6. In a machine of the class described, a cylinder having substantially closed ends, absorbent material in the interior of the cylinder, means for forcing the pasty material into said cylinder, retarding means to prevent the rapid movement of the pasty material in opposite directions whereby lateral pressure is exerted against the lateral walls of the cylinder and moisture is extracted from the pasty material, and whereby a cake of substantially dry material is formed at different ends of the cylinder.

7. In a chocolate-press, a casing longitudinally divided and having two screws therein and slowly rotated in opposite directions, said screws each having a right and left hand thread and overlapping each other, an interior lining of perforated metal in close contact with the blades of the screws, a felt backing for said metal lining, and transverse grooves back of said felt backing whereby when the machine is operated, a dry cake will be formed from the pasty mass.

8. In a machine of the class described, a casing having two screws located therein, and means for rotating said screws in opposite directions, the blades of said screws overlapping each other, a restricted opening at one end of said casing, absorbent material within said casing and adjacent the periphery of the screws, means for forcing a pasty or semiliquid material into the casing under pressure, said means for forcing the material into the casing being operated at a greater speed than the rotation of the screws, whereby lateral pressure is created within the cylinder, and a cake of dry material is accumulated at one end of the casing.

GABRIEL CARLSON.

Witnesses:
 WM. H. CHAPIN,
 H. W. BOWEN.